(12) United States Patent
Jin et al.

(10) Patent No.: US 11,416,101 B2
(45) Date of Patent: Aug. 16, 2022

(54) ELECTRONIC DEVICE INCLUDING FINGERPRINT SENSOR

(71) Applicant: Samsung Electronics Co., Ltd., Gyeonggi-do (KR)

(72) Inventors: Yunjang Jin, Gyeonggi-do (KR); Suna Kim, Gyeonggi-do (KR); Kemsuk Seo, Gyeonggi-do (KR); Bongjae Rhee, Gyeonggi-do (KR); Seyoung Jang, Gyeonggi-do (KR); Chihyun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/784,334

(22) Filed: Feb. 7, 2020

(65) Prior Publication Data
US 2020/0264756 A1 Aug. 20, 2020

(30) Foreign Application Priority Data
Feb. 19, 2019 (KR) .................... 10-2019-0019440

(51) Int. Cl.
| | | |
|---|---|---|
| *G06F 3/00* | (2006.01) | |
| *G06F 3/041* | (2006.01) | |
| *G06F 21/32* | (2013.01) | |
| *G06V 40/13* | (2022.01) | |
| *G06V 40/12* | (2022.01) | |

(52) U.S. Cl.
CPC ........ *G06F 3/04186* (2019.05); *G06F 3/0412* (2013.01); *G06F 21/32* (2013.01); *G06V 40/13* (2022.01); *G06V 40/1347* (2022.01); *G06V 40/1365* (2022.01)

(58) Field of Classification Search
None
See application file for complete search history.

(56) References Cited

U.S. PATENT DOCUMENTS

| | | | |
|---|---|---|---|
| 2017/0185820 A1* | 6/2017 | Sun | G01R 31/44 |
| 2018/0373917 A1* | 12/2018 | Sheik-Nainar | G06K 9/00912 |
| 2019/0205682 A1* | 7/2019 | Huang | G01R 27/2605 |
| 2019/0340455 A1 | 11/2019 | Jung et al. | |
| 2019/0354738 A1 | 11/2019 | Baek et al. | |
| 2019/0377929 A1* | 12/2019 | Lundahl | G06K 9/0002 |

FOREIGN PATENT DOCUMENTS

| | | |
|---|---|---|
| KR | 10-2018-0081356 A | 7/2018 |
| KR | 10-2018-0091597 A | 8/2018 |

* cited by examiner

*Primary Examiner* — Michael A Faragalla
(74) *Attorney, Agent, or Firm* — Cha & Reiter, LLC

(57) ABSTRACT

Disclosed is an electronic device that includes a housing including a first plate facing a first direction, the first plate including a fingerprint sensing area, a second plate facing a second direction opposite to the first direction, and a side member interposed between the first and second plates, a touch screen display interposed between the first and second plates and having at least a portion exposed through the first plate of the housing, a fingerprint sensor interposed between the touch screen display and the second plate, and a processor connected to the fingerprint sensor. The processor may determine whether the fingerprint sensing area is contaminated and determine whether to register a fingerprint image captured by the fingerprint sensor based on whether the fingerprint sensing area is contaminated. In addition, it is possible to implement other various embodiment understood through the disclosure.

10 Claims, 12 Drawing Sheets

ELECTRONIC DEVICE INCLUDING FINGERPRINT SENSOR

CROSS-REFERENCE TO RELATED APPLICATION(S)

This application is based on and claims priority under 35 U.S.C. § 119 to Korean Patent Application No. 10-2019-0019440, filed on Feb. 19, 2019, in the Korean Intellectual Property Office, the disclosure of which is incorporated by reference herein its entirety.

BACKGROUND

1. Field

The instant disclosure generally relates to an electronic device including a fingerprint sensor. Specifically, the instant disclosure relates to an electronic device including an in-screen type fingerprint sensor, where the fingerprint sensor is disposed in a fingerprint sensing area within the active display area of the display included in the electronic device.

2. Description of Related Art

The electronic device may include a sensor that supports a fingerprint recognition function. A sensor that provides the fingerprint recognition function may be arranged at a lower periphery of a display area in an outer portion of an electronic device or a back surface of a case of the electronic device, and the electronic device may support a fingerprint authentication function based thereon.

In recent years, as user preference for large screens has increased, research for increasing the screen size of the portable electronic device has been continuously made. For example, attempts have been made to implement a large screen by arranging the fingerprint sensor, which was previously arranged in the non-display area (e.g., bezel area) of the electronic device, on the display area of the display. Accordingly, the non-display or bezel are may be reduced. Hereinafter, this type of fingerprint sensors may be referred to as in-screen type.

The above information is presented as background information only to assist with understanding of the disclosure. No determination has been made, and no assertion is made, as to whether any of the above might be applicable as prior art with regard to the disclosure.

SUMMARY

Surfaces of the electronic device that are exposed to the outside, such as the display itself, the cover glass protecting the display, the protective film attached to protect the cover glass, or the like, may be contaminated or damaged by scratches, foreign objects, or cracks on the cover glass, or air bubbles between the cover glass and the protective film.

When these contamination happen to overlap with the fingerprint sensing area of the in-screen type fingerprint sensor, authentication error may occur.

In accordance with an aspect of the disclosure, an electronic device includes a housing including a first plate facing a first direction, the first plate including a fingerprint sensing area, a second plate facing a second direction opposite to the first direction, and a side member interposed between the first and second plates and arranged in at least a portion of a side surface of the electronic device, a touch screen display interposed between the first and second plates and having at least a portion exposed through the first plate of the housing, a fingerprint sensor interposed between the touch screen display and the second plate, and a processor connected to the fingerprint sensor, wherein the processor may determine whether the fingerprint sensing area is contaminated and determine whether to register a fingerprint image captured by the fingerprint sensor based on whether the fingerprint sensing area is contaminated.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of drawings, similar elements may be marked by similar reference numerals.

DETAILED DESCRIPTION

Various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Hereinafter, a structure of an electronic device according to an embodiment will be described with reference to FIGS. 1 to 4. Hereinafter, the terms "picture" and "image" may be used interchangeably to have the same meaning.

Aspects of the disclosure are to address at least the above-mentioned problems and/or disadvantages and to provide at least the advantages described below. Accordingly, an aspect of the disclosure is to provide an electronic device that is capable of providing a fingerprint registration method that identifies contamination of the fingerprint recognition area of the electronic device to improve reliability and reduces an authentication failure rate.

Figure 1:
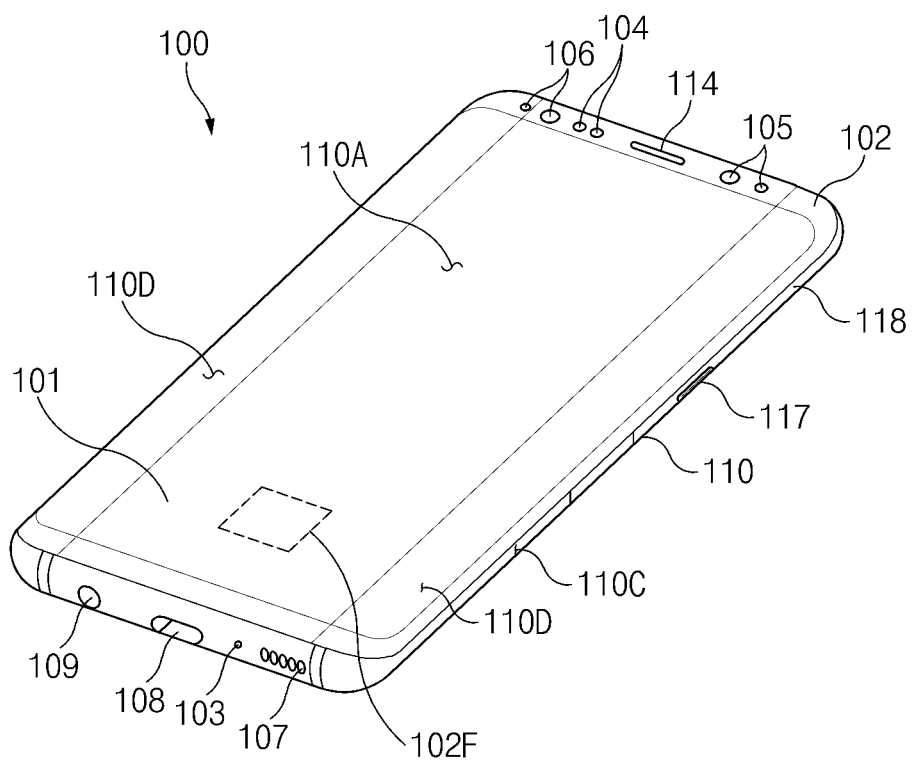
FIG. 1 is a perspective view of a front side of a mobile electronic device according to one embodiment.
Figure 2:
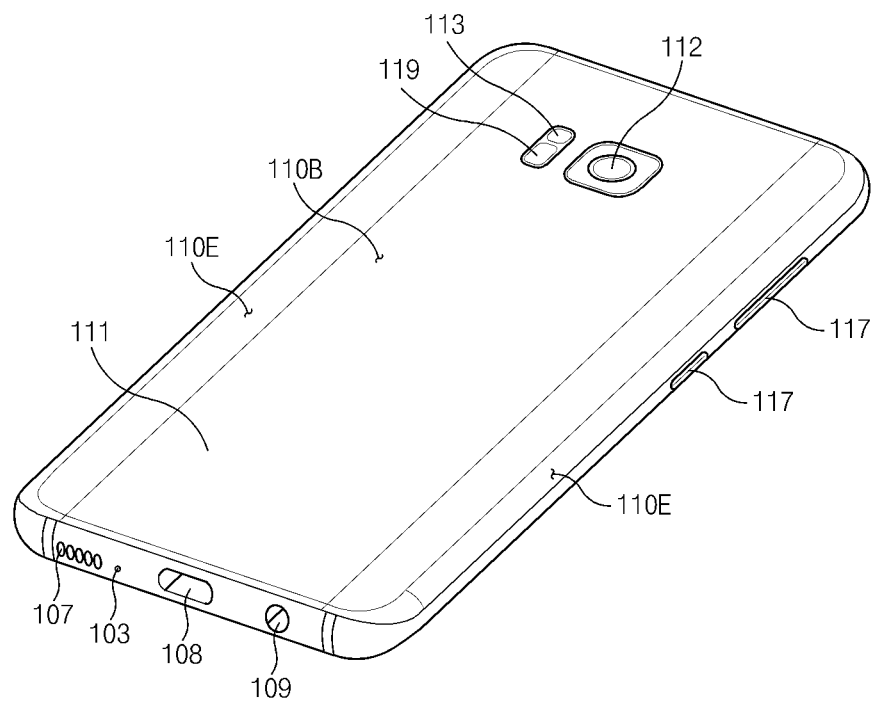
FIG. 2 is a perspective view of a rear surface of the electronic device of FIG. 1.
Figure 3:
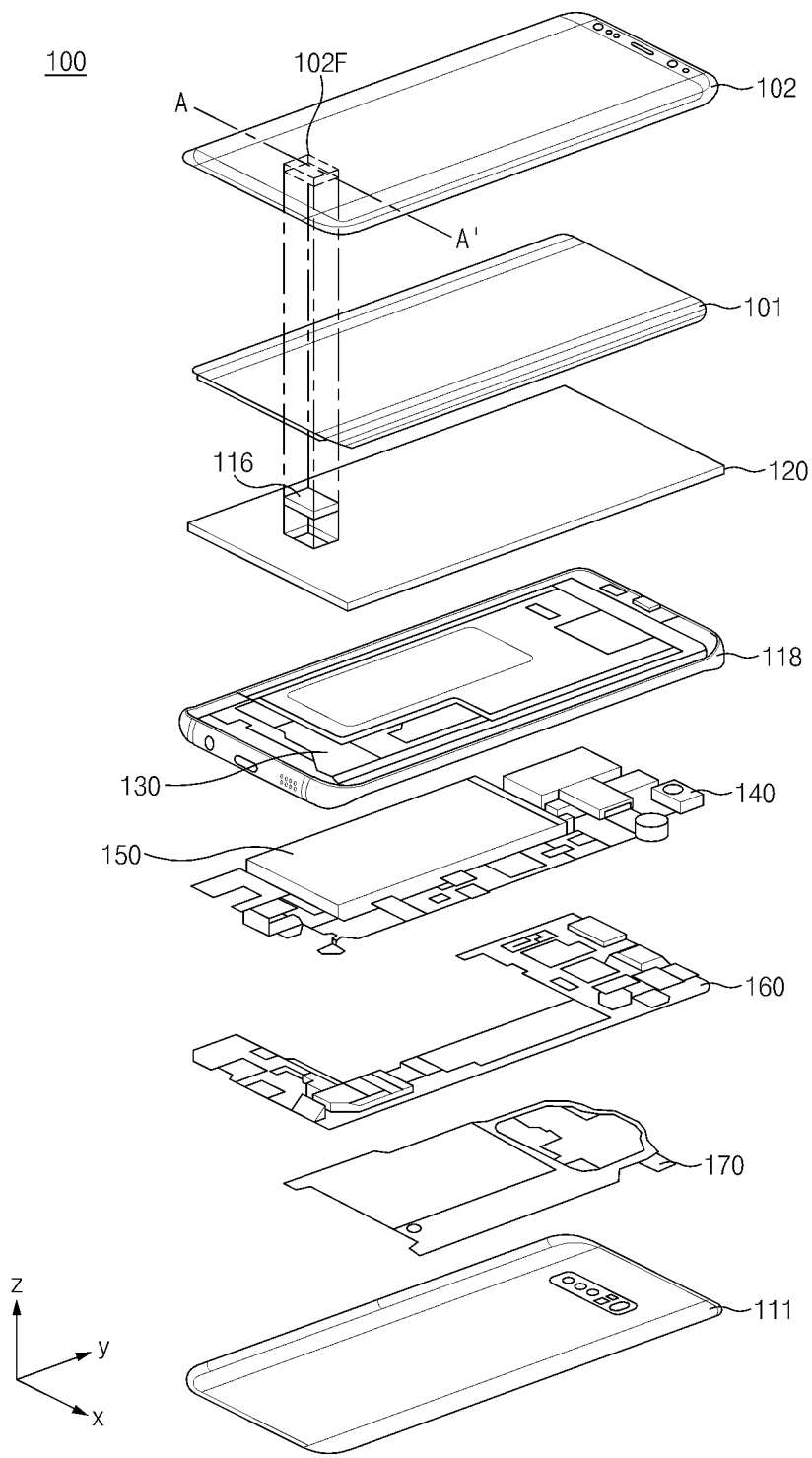
FIG. 3 is an exploded perspective view of the electronic device of FIG. 1.
Figure 4:
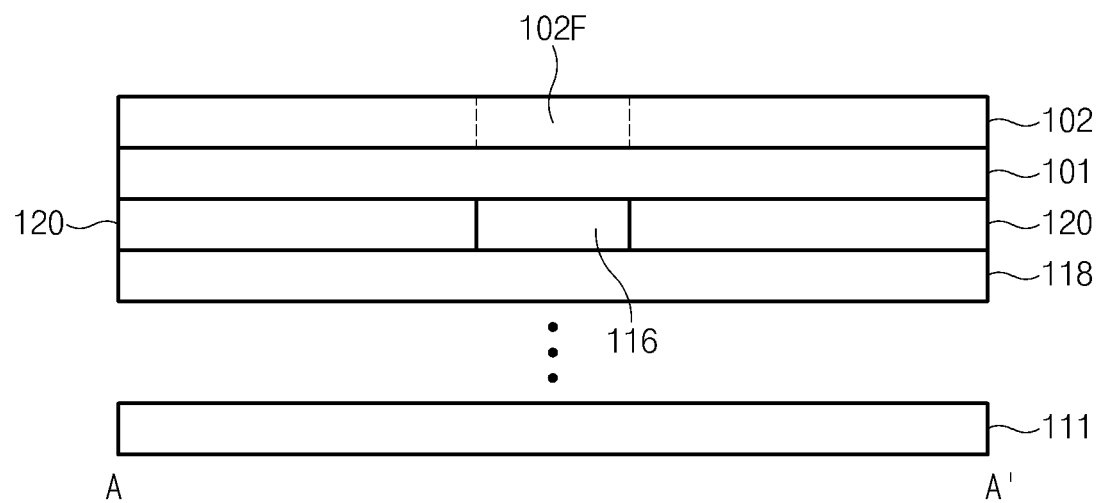
FIG. 4 is a cross-sectional view of the electronic device taken along the line A-A' of FIG. 3.

FIG. 1 is a perspective view of a front side of a mobile electronic device according to one embodiment. FIG. 2 is a perspective view of a rear surface of the electronic device of FIG. 1. FIG. 3 is an exploded perspective view of the electronic device of FIG. 1. FIG. 4 is a cross-sectional view of the electronic device taken along the line A-A' of FIG. 3.

Referring to FIGS. 1 and 2, an electronic device 100 according to an embodiment may include a first surface (or front surface) 110A, a second surface (or rear surface) 110B, and a housing 110 that includes a side surface 110C surrounding a space between the first and second surfaces 110A and 110B. In another embodiment (not shown), the housing may refer to a structure that includes some of the first and second surfaces 110A and 110B, and the side surface 110C of FIG. 1. According to an embodiment, at least a portion of the first surface 110A may be formed with a front plate 102 (e.g., a glass or polymer plate including various coating layers) that is substantially transparent. The second surface 110B may be formed with a back plate 111 which is substantially opaque. For example, the back plate 111 may be formed with coated or colored glass, ceramic, polymer, metal (e.g., aluminum, stainless steel (STS), or magnesium), or a combination of at least two of the above materials. The side surface 110C may combine the front and back plates 102 and 111 and formed in a side bezel structure (or "side member") 118 that includes metal and/or polymer. In an embodiment, the back plate 111 and the side bezel structure 118 may be integrally formed so that they are made of the same material (e.g., a metal material such as aluminum).

In the illustrated embodiment, the front plate 102 may include two first areas 110D which seamlessly extend from the first surface 110A while being curved toward the back plate 111 and are disposed at both ends of the long edge of the front plate 102. In the illustrated embodiment (see FIG. 2), the back plate 111 may include two second areas 110E which seamlessly extend from the second surface 110B while being curved toward the front plate 102 and are disposed at both ends of the long edge of the back plate 111. In an embodiment, the front plate 102 (or the back plate 111) may include only one of the first areas 110D (or the second areas 110E). In another embodiment, a portion of the first areas 110D or the second areas 110E may not be included. In the above illustrated embodiments, when viewed from the side of the electronic device 100, the side bezel structure 118 may have a first thickness (or width) at a portion in which the first or second areas 110D or 110E are not included and a second thickness thinner than the first thickness at a portion in which the first and second areas 110D or 110E are included.

A fingerprint sensing area 102F may be formed on at least a portion of the front plate 102. The fingerprint sensing area 102F may refer to the area in which a fingerprint is detectable on the front plate 102. Hereinafter, the fingerprint sensor constituting the fingerprint sensing area 102F will be described in detail with reference to FIGS. 3 and 4.

According to an embodiment, the electronic device 100 may include at least one of display 101, audio modules 103, 107 and 114, sensor modules 104 and 119, camera modules 105, 112 and 113, key input device 117, light emitting element 106, and connector holes 108 and 109. In an embodiment, the electronic device 100 may omit at least one of components (e.g., the key input device 117 or the light emitting element 106) or may further include other components.

For example, the display 101 may be exposed through a substantial portion of the front plate 102. In an embodiment, at least a portion of the display 101 may be exposed through the front plate 102 forming the first surface 110A and the first areas 110D of the side surface 110C. In an embodiment, the corners of the display 101 may have similar shapes as those of the adjacent corners of the front plate 102. In another embodiment (not shown), the distance between the outer edge of the display 101 and the outer edge of the front plate 102 may be minimized in order to expand the area where the display 101 is exposed.

In another embodiment (not shown), a recess or opening may be formed in a portion of the screen display area of the display 101, and at least one of the audio module 114, the sensor module 104, the camera module 105 and the light emitting element 106 may be disposed in the recess or opening. In another embodiment (not shown), at least one of the audio module 114, the sensor module 104, the camera module 105, and the light emitting element 106 may be disposed on the back of the screen display area of the display 101. In another embodiment (not shown), the display 101 may be coupled or arranged adjacent to a touch sensing circuit, a pressure sensor capable of measuring the strength (pressure) of a touch, and/or a digitizer for detecting a magnetic field stylus pen. In an embodiment, at least a portion of the sensor module 104 and 119, and/or at least a portion of the key input device 117 may be arranged in the first and/or second areas 110D and/or 110E.

The audio modules 103, 107 and 114 may include the microphone hole 103 and the speaker holes 107 and 114. A microphone for obtaining external sound may be arranged in the microphone hole 103, and in an embodiment, a plurality of microphones may be arranged in the microphone hole 103 to sense a sound direction. The speaker holes 107 and 114 may include the external speaker hole 107 and the call receiver hole 114. In an embodiment, the speaker holes 107 and 114 and the microphone hole 103 may be implemented as one hole, or a speaker may be included without the speaker holes 107 and 114 (e.g., a piezo speaker).

The sensor module 104 and 119 may generate an electrical signal or a data value corresponding to an operating state inside the electronic device 100 or an external environment state. For example, the sensor module 104 and 119 may include the first sensor module 104 (e.g., a proximity sensor), a second sensor module (not shown: e.g., a fingerprint sensor), and/or the third sensor module (e.g., an HRM sensor) 119 arranged on the second surface 110B of the housing 110. The fingerprint sensor may be located (e.g., located between the front plate 102 and the display 101) on not only the first surface 110A of the housing 110 to form the fingerprint sensing area 102F but also the second surface 110B. The electronic device 100 may include at least one of sensor modules (not shown) such as a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, an illumination sensor 104, and the like.

The camera modules 105, 112 and 113 may include the first camera device 105 arranged on the first surface 110A of the electronic device 100, and the second camera 112 arranged on the second surface 110B, and/or the flash 113. The camera devices 105 and 112 may include one or a plurality of lenses, an image sensor, and/or an image signal processor. The flash 113 may include, for example, a light emitting diode or a xenon lamp. In an embodiment, two or more lenses (an infrared camera, wide angle and telephoto lenses) and image sensors may be arranged on one surface of the electronic device 100.

The key input device 117 may be arranged on the side surface 110C of the housing 110. In another embodiment, the electronic device 100 may not include some or all of the above-mentioned key input device 117 and the non-included key input device 117 may be implemented in another form such as a soft key or the like on the display 101. In an embodiment, the key input device may include a sensor module of the housing 110.

For example, the light emitting element 106 may be arranged on the first surface 110A of the housing 110. For example, the light emitting element 106 may provide state information of the electronic device 100 in the form of light. In another embodiment, for example, the light emitting element 106 may provide a light source that interworks with the operation of the camera module 105. For example, the light emitting element 106 may include an LED, an IR LED, and a xenon lamp.

The connector holes 108 and 109 may include the first connector hole 108 capable of receiving a connector (e.g., a USB connector) for transmitting and receiving power and/or data to and from an external electronic device, and the second connector hole (e.g., an earphone jack) 109 capable of accommodating a connector for transmitting and receiving an audio signal to and from an external electronic device.

Referring to FIGS. 3 and 4, the electronic device 100 may include the side bezel structure 118, a first support member 130 (e.g., a bracket), the front plate 102, the display 101, a fingerprint sensor 116, an embossed layer 120, a printed circuit board 140, a battery 150, a second support member 160 (e.g., a rear case), an antenna 170, and the back plate 111. In an embodiment, at least one of the components (e.g., the first or second support member 130 or 160) may be omitted from the electronic device 100, or the electronic device 100 may further include another component. At least one of the components of the electronic device 100 may be the same as or similar to at least one of the components of the electronic device 100 of FIG. 1 or 2, and the duplicative description will be omitted below.

The fingerprint sensor 116 and the embossed layer 120 may be interposed between the display 101 and the side bezel structure 118.

The embossed layer 120 may include a material for cushioning the impact applied to the front plate 102 or the display 101. The embossed layer 120 may refer to a layer on which an embossing pattern is formed. The embossed layer 120 may have a hole in which the fingerprint sensor 116 is located.

The fingerprint sensor 116 may be located below the front plate 102 and the display 101 in the fingerprint sensing area 102F on the front plate 102. The fingerprint sensing area 102F may refer to an area in which the fingerprint can be detected on the front plate 102. The fingerprint sensing area 102F may be formed corresponding to the area of the fingerprint sensor 116. However, the area of the fingerprint sensing area 102F and the area of the fingerprint sensor 116 are not necessarily the same. In addition, the fingerprint sensing area 102F may not be located at the position corresponding directly to the fingerprint sensor 116 depending on how the fingerprint sensor 116 is mounted. The fingerprint sensor 116 may be an optical, capacitive or ultrasonic fingerprint sensor. Although the fingerprint sensor 116 located between the display 101 and the side bezel structure 118 is illustrated in FIGS. 3 and 4, the location of the fingerprint sensor 116 is not so limited. It is sufficient that the fingerprint sensor 116 is located with the fingerprint sensing area 102F on the front plate 102 (or the fingerprint sensing area 102F of the display 101 when the front plate 102 is omitted). In addition, for example, according to an embodiment, the fingerprint sensor 116 may be located between the display 101 and the front plate 102. In addition, according to an embodiment, the fingerprint sensor 116 may be disposed on the side bezel structure 118. In this case, the fingerprint sensor 116 may be attached to the side bezel structure 118 using an adhesive member. In addition, according to an embodiment, a portion (e.g., sensing unit or electrode) of the fingerprint sensor 116 may be located in a black matrix area inside the pixels or in a black matrix between the pixels of the panel of the display 101. In addition, according to an embodiment, a portion or all of the fingerprint sensor 116 may be printed on one surface of the front plate 102 or be etched on one surface.

In addition, although the electronic device 100 including only one fingerprint sensor 116 is illustrated in FIGS. 3 and 4, the electronic device 100 may include a plurality of fingerprint sensors 116 according to an embodiment, and the front plate 102 may also include a plurality of sensing areas 102F corresponding to the plurality of fingerprint sensors 116.

The first support member 130 may be arranged inside the electronic device 100 and connected to the side bezel structure 118, or may be integrally formed with the side bezel structure 118. For example, the first support member 130 may be formed of a metal material and/or a non-metal material (e.g. polymer). The first support member 130 may be coupled to the display 101 on one surface thereof and coupled to the printed circuit board 140 on the other surface thereof. Processor, memory, and/or an interface may be mounted on the printed circuit board 140. For example, the processor may include one or more central processing units, application processors, graphics processing units, image signal processors, sensor hub processors, and/or communication processors. Further, the processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

For example, the memory may include volatile memory or nonvolatile memory.

For example, the interface may include high definition multimedia interface (HDMI), universal serial bus (USB) interface, SD card interface, and/or audio interface. For example, the interface may electrically or physically connect the electronic device 100 to an external electronic device, and may include a USB connector, an SD card/MMC connector, or an audio connector.

The battery 150 may be a device for supplying power to at least one component of the electronic device 100, and may include, for example, a non-rechargeable primary battery, or a rechargeable secondary battery, or a fuel cell. At least a portion of the battery 150 may be arranged, for example, substantially coplanar with the printed circuit board 140. The battery 150 may be integrally arranged in the electronic device 100 or may be detachably attached to the electronic device 100.

The antenna 170 may be arranged between the back plate 111 and the battery 150. For example, the antenna 170 may include a near field communication (NFC) antenna, a wireless charging antenna, and/or a magnetic secure transmission (MST) antenna. For example, the antenna 170 may perform short-range communication with an external device or wirelessly transmit and receive power required for charging. In another embodiment, the antenna structure may be formed with the side bezel structure 118 and/or a part of the first support member 130, or a combination thereof.

Hereinafter, a configuration of a fingerprint sensor module included in an electronic device according to an embodiment will be described with reference to FIG. 5. For brevity, descriptions of features and configurations previously explained above are omitted below.

Figure 5:
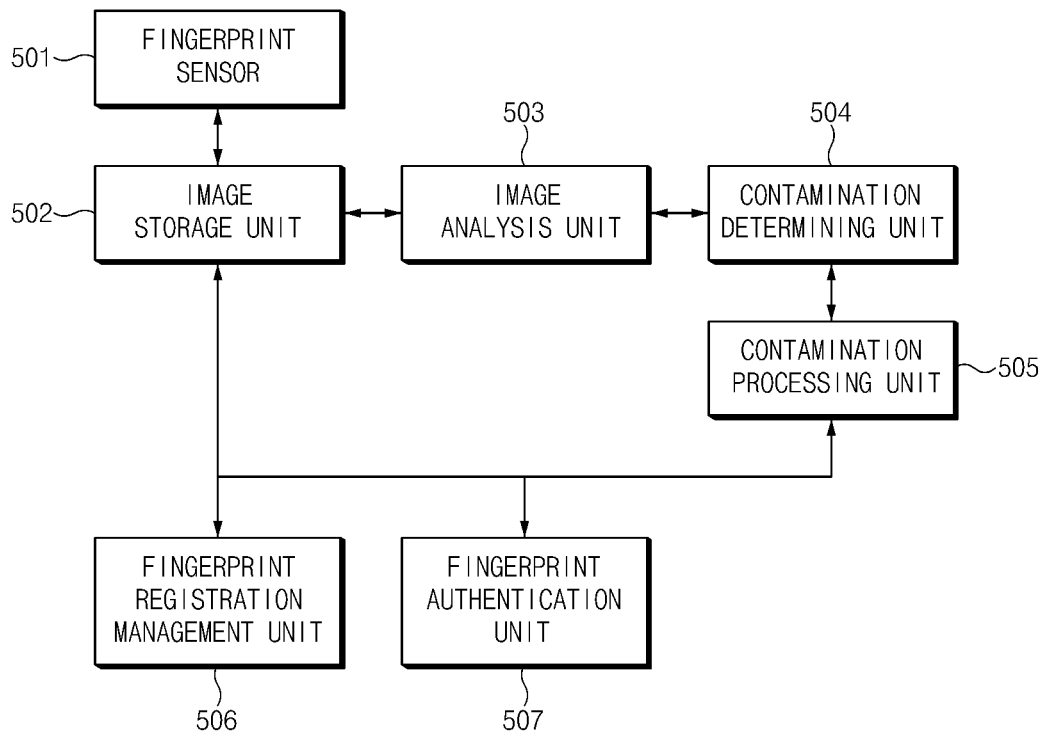
FIG. 5 is a block diagram illustrating a configuration of a fingerprint sensor module of an electronic device according to an embodiment.

FIG. 5 is a block diagram illustrating a configuration of a fingerprint sensor module of an electronic device according to an embodiment.

Referring to FIG. 5, the fingerprint sensor module included in the electronic device may include a fingerprint sensor 501, an image storage unit 502, an image analysis unit 503, a contamination determination unit 504, a contamination processing unit 505, a fingerprint registration management unit 506, and a fingerprint authentication unit 507. The image storage unit 502 may be included in a memory (e.g., a memory 1230 of FIG. 12). The image storage unit 502 may be referred to as a memory (e.g., the memory 1230 of FIG. 12). The image analysis unit 503, the contamination determination unit 504, the contamination processing unit 505, the fingerprint registration management unit 506, and the fingerprint authentication unit 507 may be implemented by a processor (e.g., a processor 1220 of FIG. 12). That is, the functions of the image analysis unit 503, the contamination determination unit 504, the contamination processing unit 505, the fingerprint registration management unit 506, and the fingerprint authentication unit 507 may be performed by a processor (e.g., the processor 1220 of FIG. 12). The image analysis unit 503, the contamination determination unit 504, the contamination processing unit 505, the fingerprint registration management unit 506, and the fingerprint authentication unit 507 may be collectively referred to as a processor (e.g., the processor 1220 of FIG. 12). The fingerprint sensor module may collectively include a fingerprint sensor, a memory, and a processor.

The fingerprint sensor 501 may capture an image in the fingerprint sensing area. The fingerprint sensor 501 may capture the fingerprint of a finger placed at the fingerprint sensing area located on the front plate of the electronic device. Alternatively, the finger may be only in proximity to the fingerprint sensing area. When contamination occurs on the surface of the fingerprint sensing area, for example, the captured image may include an image of such contamination. Hereinafter, the term "contamination" may refer to contamination that may occur in the fingerprint sensing area, such as cracks, scratches, or dirt on the surface of the electronic device, or an air bubble between the front plate and the protective film disposed on the front plate. The contamination may interfere with fingerprint recognition.

The fingerprint sensor 501 may capture fingerprints using various methods. The fingerprint sensor 501 may be an optical, capacitive or ultrasonic fingerprint sensor. The optical fingerprint sensor may capture the fingerprint image of the surface of the finger by using a photosensitive diode and obtain the fingerprint based on difference in light reflectance between the ridges and valleys of the fingerprint. The capacitive fingerprint sensor may obtain the fingerprint by using capacitance differences between peaks or ridges where the fingerprint contacts the electrode and valleys where the fingerprint is not in contact. The ultrasonic fingerprint sensor may generate ultrasonic waves using piezo devices and obtain the fingerprint by using ultrasonic reflectance of the ridges and valleys of the fingerprint.

The fingerprint sensor 501 may capture a background image. The background image may be an image that is captured when the finger of a user is not touching or in proximity to the fingerprint sensing area. That is, the background image is an image that does not include the finger of the user.

Specifically, if the fingerprint sensor is an ultrasonic fingerprint sensor, the characteristics of the sensor itself, the quality of the captured image may change depending on the display characteristics of the electronic device equipped with the fingerprint sensor, the ambient temperature (or, the temperature of the display, the display temperature of the fingerprint sensing area, the temperature of the fingerprint sensor surface, and the like), or the change in a physical property as time pass. Therefore, it may be important to first capture a background image corresponding to the environment of the electronic device.

The fingerprint sensor 501 may periodically capture the background image, or may capture the background image aperiodically when various external factors such as temperature is changed. The background image may be used to identify contamination of the fingerprint sensing area and/or to correct the fingerprint image by removing the image of the contamination from the fingerprint image.

According to an embodiment, the fingerprint sensor 501 may obtain at least one background image based on detection of an occurrence of a specified event.

According to an embodiment, the specified event may be when the temperature measured by the electronic device corresponds to a temperature that is associated with a reliability lower than a reference reliability among a plurality of values registered in the memory of the electronic device. The reference reliability provide a reference for acquiring the background image. For example, the memory may store value 'a' associated with about 10 degrees Celsius, value 'b' associated with about 20 degrees Celsius, and value 'c' associated with about 30 degrees Celsius. These values provide references for the background image acquisition. Value 'b' may have a lower reliability than the values 'a' and 'c'. The fingerprint sensor 501 may determine to obtain at least one background image to improve the reliability of the value 'b', based on identifying that the current temperature measured by the electronic device corresponds to 20 degrees Celsius, and may obtain at least one background image based on the determination. However, this is merely an example and the embodiment is not so limited.

According to an embodiment, the specified event may be when a specified time interval has elapses from when the last time a background image was obtained. For example, based on identifying that three days (specified time interval) has elapsed since the last time the background image was obtained, the fingerprint sensor 501 may obtain at least one background to improve the reliability. However, this is merely an example and the embodiment is not so limited.

According to an embodiment, based on detecting that the event occurs, the fingerprint sensor 501 may inform the processor that it is required to obtain at least one background image. The processor may control the fingerprint sensor 501 to obtain at least one image in response to receiving the notification from the fingerprint sensor 501. Based on the information about at least one obtained background image, the reliability of at least some of the plurality of values may be improved, and the processor may identify that the obtaining of the background image is completed based on the improved reliability of at least some of the plurality of values.

According to an embodiment, while at least one background image is obtained, the fingerprint sensor 501 may receive a signal indicating that a touch input is detected from a touch sensor (not shown) included in the electronic device. The fingerprint sensor 501 may stop obtaining at least one background image in response to the reception of the signal from the touch sensor. In response to the reception of the signal from the touch sensor, the fingerprint sensor 501 may transmit a signal informing the processor that a touch input is detected while obtaining the background image, in order to stop obtaining the background image. The processor may control to stop obtaining the background image in response to the reception of the signal from the fingerprint sensor 501.

In addition, according to an embodiment, the fingerprint sensor 501 may stop obtaining at least one background image based on identifying that a value identified based on at least one background image is out of a reference range. For example, when foreign material is placed on the fingerprint sensor 501, the value identified based on the at least one background image may be out of the reference range. Because this particular background image may cause inaccurate or unnecessary correction, the fingerprint sensor 501 may stop obtaining the background image based on the identification. The fingerprint sensor 501 according to an embodiment may transmit a signal informing the processor that foreign material is detected, in order to stop obtaining the background image based on the identification. The processor may control to stop obtaining the background image in response to the reception of the signal from the fingerprint sensor 501.

As described above, the electronic device according to an embodiment may determine whether a touch input is received based on the signaling between the touch sensor and the fingerprint sensor 501 while obtaining at least one background image for the correction of the fingerprint image by using the fingerprint sensor 501. According to an embodiment of the disclosure, in response to detecting the touch input while obtaining the at least one background image by using the fingerprint sensor 501, the electronic device stops obtaining the background image, thereby preventing unnecessary and/or incorrect correction from being performed. According to an embodiment, in response to detecting the touch input while obtaining the at least one background image by using the fingerprint sensor, the electronic device stops obtaining the background image, thereby preventing power from being consumed for unnecessary or incorrect correction.

The memory (e.g., the image storage unit 502) may store the image captured by the fingerprint sensor 501 during fingerprint registration or fingerprint authentication. The memory may include a temporary storage space for temporarily storing the image captured by the fingerprint sensor 501 for image analysis. In addition, the memory may include a storage space for storing a fingerprint template to be compared with the fingerprint image captured during fingerprint authentication. The memory may update the fingerprint template by using a fingerprint image that has been successfully authenticated.

The fingerprint template may be information about a fingerprint registered through a fingerprint registration process of the electronic device. The fingerprint template may be information about an image obtained by capturing a fingerprint of the user, which then will be used for biometric identification of the user. The fingerprint template may be the captured image of the fingerprint itself, or may be information that was extracted from processing the image, such as feature extraction, modification, encryption, or the like. The fingerprint template may also be stored in a secure location which is safe from external access by general applications, by using technology such as TrustZone® for enhanced security. The fingerprint template may be an object or information to be compared with the input fingerprint to determine whether the user corresponding to the input fingerprint matches the user corresponding to the registered fingerprint template. If so, the user is authenticated.

The processor (e.g., the image analysis unit 503) analyzes the captured images. Comparisons between images or comparisons between pixels within an image may be performed. The processor may perform analysis of the background image, comparison between fingerprint images (e.g. the fingerprint template and the input fingerprint), and comparison between the fingerprint image and the background image. The processor may determine the contrast between the pixels in the images. The processor may determine the amount of change in pixel values over time. The processor may perform an image processing process for image analysis (e.g., converting gray scale values into black/white values).

The processor (e.g., the contamination determination unit 504) may determine whether contamination occurs in the fingerprint sensing area, the location and size of the contamination area, and the like through image analysis. The processor may determine whether the contamination shape is included in the image by analyzing the background image, comparing various fingerprint images, and comparing the fingerprint image with the background image.

The processor (e.g., the contamination processing unit 505) may remove the contamination from the captured image to improve the fingerprint recognition rate, or may perform image processing for reducing the influence of the contamination. The processor may perform image processing to remove the background image from the fingerprint image.

The processor (e.g., the fingerprint authentication unit 507) may perform a matching algorithm by using the captured fingerprint image and the stored fingerprint template, and determine whether to authenticate the user based on the execution result.

The processor (e.g., the fingerprint registration management unit 506) may register and store the captured fingerprint image as the fingerprint template of the user. The fingerprint template may be a target to be compared with a fingerprint captured at the time of authentication. The processor may update at least a portion of the previous fingerprint template with a new fingerprint template based on the fingerprint authentication result.

The components included in the fingerprint sensor module illustrated in FIG. 5 are merely examples, and at least one configuration may be integrated or at least one configuration may be omitted.

Hereinafter, a fingerprint registration operation of an electronic device according to an embodiment will be described with reference to FIGS. 6 and 7. For brevity, descriptions of features and configurations previously explained above are omitted below.

Figure 6:
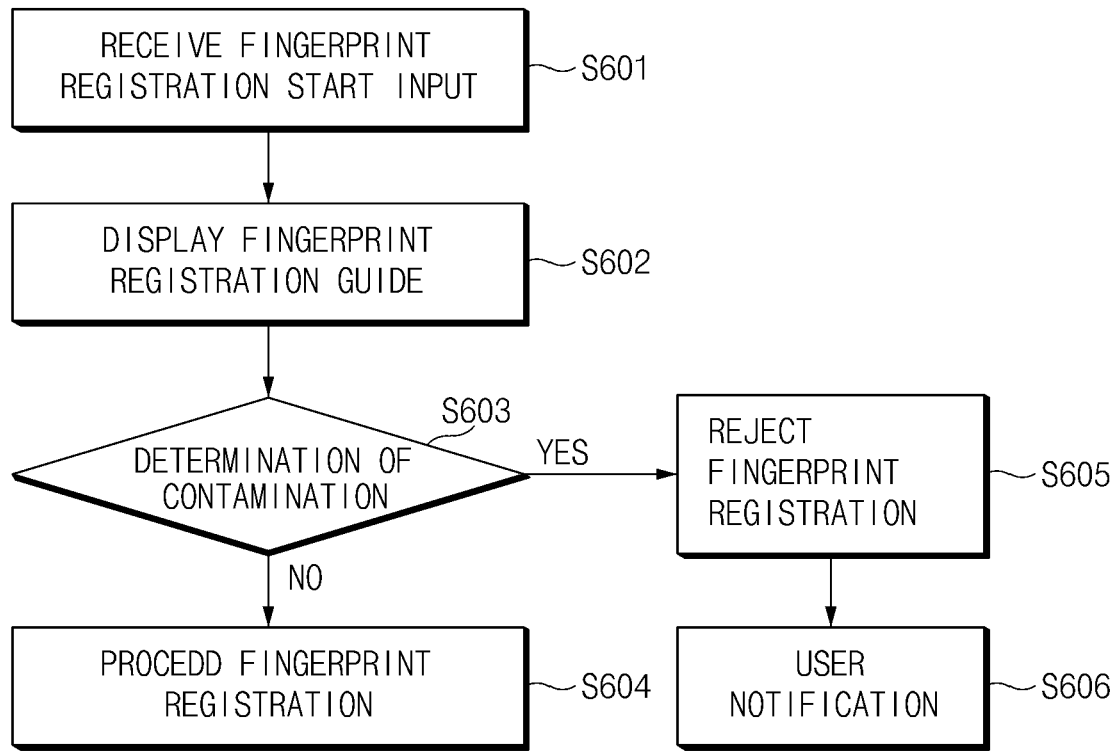
FIG. 6 is a flowchart illustrating a fingerprint registration operation of an electronic device according to an embodiment.

FIG. 6 is a flowchart illustrating a fingerprint registration operation of an electronic device according to an embodiment. FIG. 7 is a view illustrating a fingerprint registration guide of an electronic device according to an embodiment.

Figure 7:
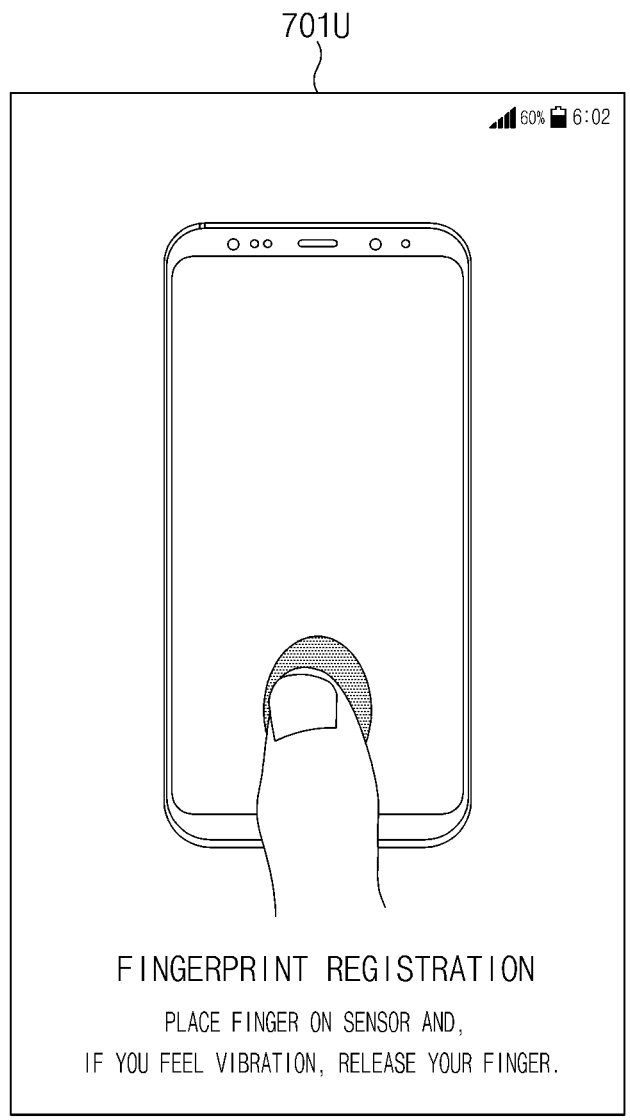
FIG. 7 is a view illustrating a fingerprint registration guide of an electronic device according to an embodiment.

Referring to FIGS. 6 and 7, the electronic device may receive a fingerprint registration start input in operation S601. The fingerprint registration start input may be an input such as a touch to allow the user to enter a fingerprint registration menu.

The electronic device may display a fingerprint registration guide in response to the fingerprint registration start input in operation S602. A fingerprint registration guide 701U may include at least one of audio, vibration, an image, an animation, and the like for guiding a user to register a fingerprint. The fingerprint registration guide 701U may guide the time when the finger is to be placed, the position at which the finger is to be placed, the time when the finger is to be removed, and the like. The fingerprint sensing area on the front plate of the electronic device may not be visually identified when the device is off because the fingerprint sensing area is integrated with the active display area. Thus, the fingerprint registration guide 701U may guide the location at which a finger is to be placed with an image of a fingerprint shape or the like. The fingerprint registration guide 701U may guide the time when the finger is to be placed with text or the like. The fingerprint registration guide 701U may guide the time of removing the finger by vibration or the like. However, the fingerprint registration guide 701U of FIG. 7 is merely an example, and the fingerprint registration guide may vary according to other embodiments.

The electronic device may capture a background image before the fingerprint registration guide 701U guides the time at which the finger is to be placed or the position at which the finger is to be placed. When the background image is captured just before the fingerprint registration guide 701U guides the time at which the finger is to be placed or the position at which the finger is to be placed, because the background image corresponding to the environment of the electronic device immediately before registration, it is possible to improve the accuracy of determining whether the fingerprint sensing area is contaminated.

According to an embodiment, the fingerprint registration guide 701U may guide the time when the finger is to be removed from the fingerprint sensing area and the electronic device may capture a background image immediately after the user lifts the finger.

In operation S603, the electronic device may determine whether the fingerprint sensing area is contaminated based on the captured background image. The electronic device may determine whether the background image has a particular shape to determine whether the fingerprint sensing area is contaminated. The electronic device may determine that the fingerprint sensing area is contaminated when the shape is identified in the captured background image while nothing (i.e. a finger) is touching the fingerprint sensing area. The shape may be an unspecified shape. As described above, the contamination may be understood as a general term of a contamination that may occur in the fingerprint sensing area such as cracks, scratches, dirt, air bubbles between the front plate and the film and may interfere with fingerprint recognition.

The determining of whether the fingerprint sensing area is contaminated in operation S603 may be performed after the background image is captured and before the fingerprint registration guide 701U is finished. Thus, the fingerprint registration guide 701U may allow sufficient time for the contamination determination. The determining of whether the fingerprint sensing area is contaminated in operation S603 may be performed while the fingerprint registration guide 701U is displayed. Alternatively, the determining of whether the fingerprint sensing area is contaminated in operation S603 may be performed while a user fingerprint is captured through the fingerprint registration guide 701U. Alternatively, the determining of whether the fingerprint sensing area is contaminated in operation S603 may be performed during a time when no separate guidance is provided while the fingerprint registration guide 701U is displayed. The fingerprint registration guide 701U may display a waiting time in which no additional guidance is provided in order to provide a time period sufficient for performing the determination of contamination.

When it is determined that there is no contamination in the fingerprint sensing area, the electronic device may proceed with fingerprint registration in operation S604. The electronic device may store the fingerprint image of the user captured while the fingerprint registration guide 701U is displayed as the fingerprint template. When the fingerprint template has been stored previously, the existing fingerprint template may be updated.

When it is determined that there is contamination in the fingerprint sensing area, the electronic device may reject fingerprint registration in operation S605. In addition, in operation S606, the electronic device may display a notification that there is a contamination in the fingerprint sensing area and/or a notification that the fingerprint registration has been rejected. The operation order of the rejection of fingerprint registration in operation S605 and the displaying of the user notification in operation S606 may be changed according to an embodiment.

In addition, the flowchart of the fingerprint registration operation illustrated in FIG. 6 is merely an example, and at least one operation may be integrated, at least one operation may be omitted, or the order of the at least one operation may be changed.

Hereinafter, a fingerprint registration operation of the electronic device according to an embodiment will be described with reference to FIG. 8. For brevity, descriptions of features and configurations previously explained above are omitted below.

Figure 8:
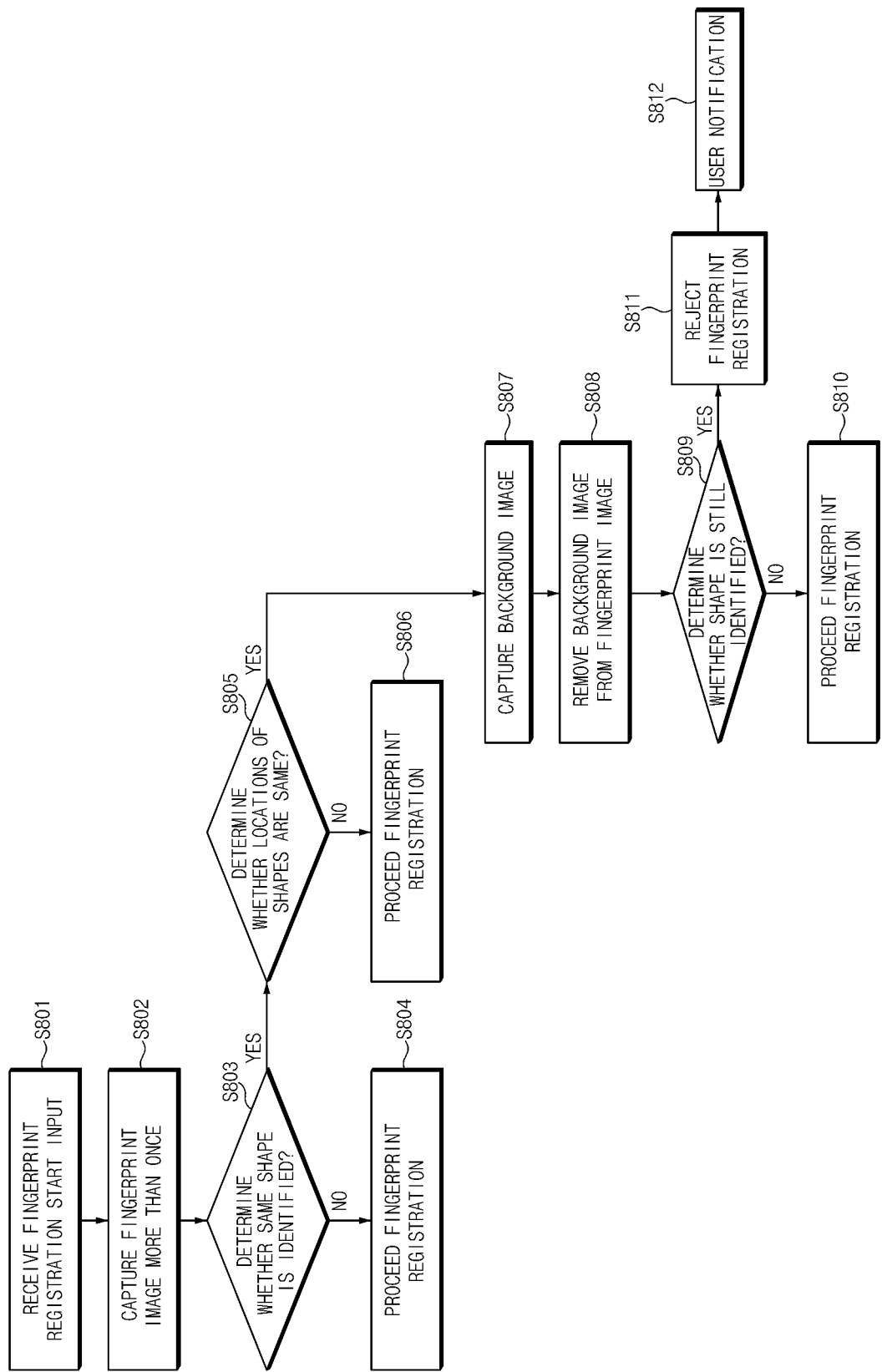
FIG. 8 is a flowchart illustrating a fingerprint registration operation of an electronic device according to an embodiment.

FIG. 8 is a flowchart illustrating a fingerprint registration operation of an electronic device according to an embodiment.

Referring to FIG. 8, the electronic device may receive a fingerprint registration start input in operation S801. The electronic device may display a fingerprint registration guide in response to the fingerprint registration start input.

In operation S802, the electronic device may capture the fingerprint image of a user more than once, such as two or N times. However, in the embodiment, for convenience, it is described that the fingerprint image of the user is captured twice. Hereinafter, the fingerprint images of the user captured twice are referred to as a first fingerprint image and a second fingerprint image.

In operation S803, the electronic device may determine whether the same shape is identified between the captured fingerprint images in order to determine whether the fingerprint sensing area is contaminated. In this case, the identifying of the same shape may mean identifying shapes in which at least a part of the shape matches (matching a certain reference or more, such as matching 90% or more). Accordingly, the shapes are not required to be completely matched with each other. The electronic device may compare the first fingerprint image with the second fingerprint image to determine whether the same shape is identified. For example, because scratches or cracks on the front plate are fixed and semi-permanent defects, when the same shape continues to appear in plural captured fingerprint images, it may be suspected that there is a crack or scratch on the front plate.

In operation S804, when the same shape is not identified between the captured fingerprint images, the electronic device may proceed with fingerprint registration.

In order to determine whether the fingerprint sensing area is contaminated, the electronic device may determine whether the locations of the shapes identified in the captured fingerprint images are the same in operation S805. In this case, the same location of the shapes may mean that at least some of the location coordinates constituting the shape coincide with each other (more than a predetermined reference, such as more than 90% coincident). Thus, the locations of the shapes do not have to coincide completely. The electronic device may compare the first fingerprint image with the second fingerprint image to determine whether the locations of the identified shapes are the same. For example, when there are scratches or cracks on the front plate, even if the location of the captured fingerprint moves due to the movement of the user touch, because the scratches or cracks on the front plate are fixed, it may be determined that the front plate has scratches or cracks when a shape is detected at the same location in the plurality of captured fingerprint images. In this case, according to an embodiment, the movement of the user touch may be sensed by a touch sensor.

The operation S803 of identifying whether there is the same shape between the captured fingerprint images and the operation S805 of determining whether the locations of the shapes identified in the captured fingerprint images are the same may be changed in sequence or may be integrated.

When the locations of the shapes identified in the captured fingerprint images are not the same, the electronic device may proceed with fingerprint registration in operation S806.

When it is determined that there is contamination in the fingerprint sensing area, the electronic device may capture a background image in operation S807. That is, the electronic device may capture a background image when the same shape and/or a shape at the same location is identified in the captured fingerprint images.

In operation S808, the electronic device may remove the captured background image from the captured fingerprint image to remove the portion in which the contamination is captured in the fingerprint sensing area from the captured fingerprint image. It may be assumed that the shape included in the background image captured when nothing touches the fingerprint sensing area is a contamination of the fingerprint sensing area itself. Therefore, it may be assumed that only the fingerprint image of the user remains when the captured background image is removed from the captured fingerprint image.

In operation S809, the electronic device may determine whether the shape is still identified in the fingerprint image from which the background image is removed. For example, when a matching feature in shape and/or location is identified above a specified reference in the images obtained by removing the background image from the first fingerprint image and obtained by removing the background image from the second fingerprint image, it may be determined that the shape is still identified. Alternatively, for example, when a shape whose shape and/or location matches the shape in the first fingerprint image by a specified reference or more is identified in the image obtained by removing the background image from the first fingerprint image, it may be determined the shape is still identified. Alternatively, for example, when a shape whose shape and/or location matches the shape in the background image by a specified reference or more is identified in the image obtained by removing the background image from the first fingerprint image, it may be determined the shape is still identified.

As it is determined that the shape is no longer identified, the electronic device may proceed with fingerprint registration in operation S810. That is, when it is determined that the contamination of the fingerprint sensing area is removed from the fingerprint image by a specified reference or more as the result of removing the background image from the fingerprint image, the fingerprint registration may be performed.

When it is determined in operation S809 that the shape is still identified in the fingerprint image from which the background image is removed as the determination result, in operation S811, the electronic device may reject the fingerprint registration. That is, even when the background image is removed from the fingerprint image, when it is determined that the contamination of the fingerprint sensing area has not been removed from the fingerprint image by a specified reference or more, the fingerprint registration may be rejected. In addition, in operation S812, the electronic device may display a notification that there is a contamination in the fingerprint sensing area and/or a notification that the fingerprint registration is rejected. The order of the operations S811 and S812 of rejecting the fingerprint registration and displaying user notification may be changed depending on an embodiment.

In addition, the flowchart of the fingerprint registration operation illustrated in FIG. 8 is merely an example, and at least one operation may be integrated, at least one process may be omitted, or the order of at least one operation may be changed.

Hereinafter, a fingerprint registration operation of an electronic device according to an embodiment will be described with reference to FIG. 9. For brevity, descriptions of features and configurations previously explained above are omitted below.

Figure 9:
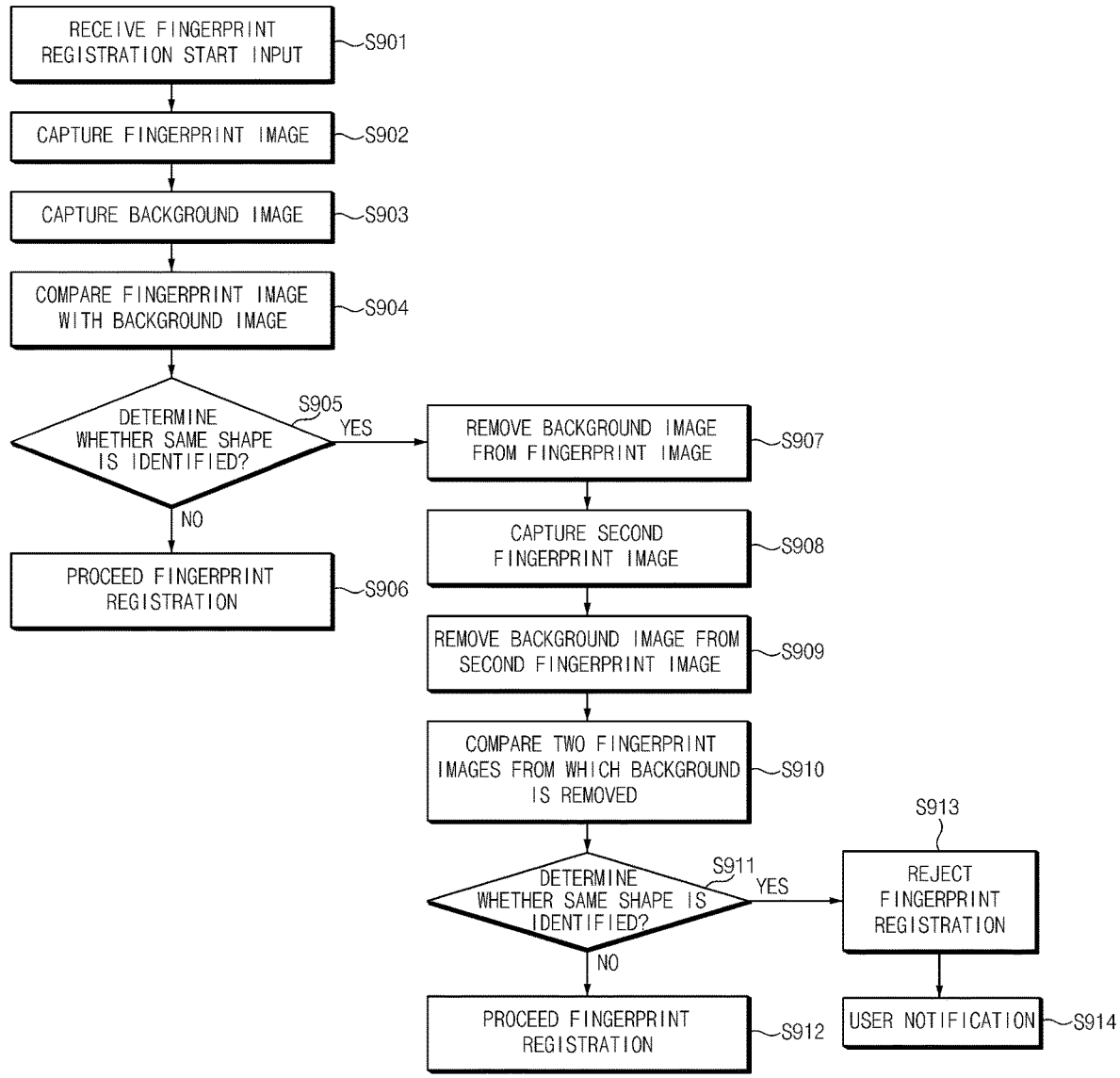
FIG. 9 is a flowchart illustrating a fingerprint registration operation of an electronic device according to an embodiment

FIG. 9 is a flowchart illustrating a fingerprint registration operation of an electronic device according to an embodiment.

Referring to FIG. 9, the electronic device may receive a fingerprint registration start input in operation S901. The electronic device may display the fingerprint registration guide according to the fingerprint registration start input.

The electronic device may capture a fingerprint image of the user (S902). The electronic device may capture a background image (S903). The order of the operations S902 and S903 may be reversed.

The electronic device may compare the captured fingerprint image with the captured background image (S904).

The electronic device may determine whether the same shape is identified between the fingerprint image and the background image in order to determine whether the fingerprint sensing area is contaminated (S905). In this case, this identifying may require identifying shapes of which features and/or locations are matched with each other by a specified reference or more. However, the shapes need not be identical. Because it may be assumed that the shape included in the background image captured when nothing touches the fingerprint sensing area is a contamination of the fingerprint sensing area itself, the identifying of the same shape in the background image and the fingerprint image may be determined as the contamination of the sensing area itself is captured in the fingerprint image.

When the same shape is not identified in the fingerprint image and the background image, the electronic device may proceed with fingerprint registration in operation S906.

When the same shape is identified in the fingerprint image and the background image, the electronic device may remove the background image from the fingerprint image in operation S907.

The electronic device may capture a second fingerprint image in operation S908. Thus, the fingerprint images of the user are captured twice and the two images are sequentially the first fingerprint image and the second fingerprint image.

In operation S909, the electronic device may remove the background image from the second fingerprint image.

In operation S910, the electronic device may compare the image in which the background image is removed from the first fingerprint image with the image in which the background image is removed from the second fingerprint image.

In operation S911, the electronic device may determine whether the same shape is identified in the image in which the background image is removed from the first fingerprint image and the image in which the background image is removed from the second fingerprint image. The electronic device may determine that the same shape is identified when the shapes and/or the locations coincide with each other by a specified reference or more in the images obtained by removing the background image from the first and second fingerprint images.

When it is determined that the same shape is not identified in the images where the background image is removed, in operation S912, the electronic device may proceed with fingerprint registration. In this case, the electronic device may determine that the background image is suitable for removing contamination of the fingerprint sensing area from the fingerprint image, and store the background image in a memory. The electronic device may store the background image in the memory and use the background image to identify or remove contamination of the fingerprint sensing area from the fingerprint image at the next fingerprint registration.

When it is determined that the same shape is identified in the images obtained by removing the background image from the first and second fingerprint images, in operation S913, the electronic device may reject fingerprint registration. In addition, the electronic device may display a notification that there is a contamination in the fingerprint sensing area and/or a notification that the fingerprint registration has been rejected in operation S914. The order of operation S913 of rejecting the fingerprint registration and the operation S914 of displaying user notification may be changed according to an embodiment.

In addition, the flowchart of the fingerprint registration operation illustrated in FIG. 9 is merely an example, and at least one process may be integrated, at least one process may be omitted, or the order of the at least one process may be changed.

Hereinafter, an electronic device according to an embodiment will be described with reference to FIGS. 10 and 11. For brevity, descriptions of features and configurations previously explained above are omitted below.

Figure 10:
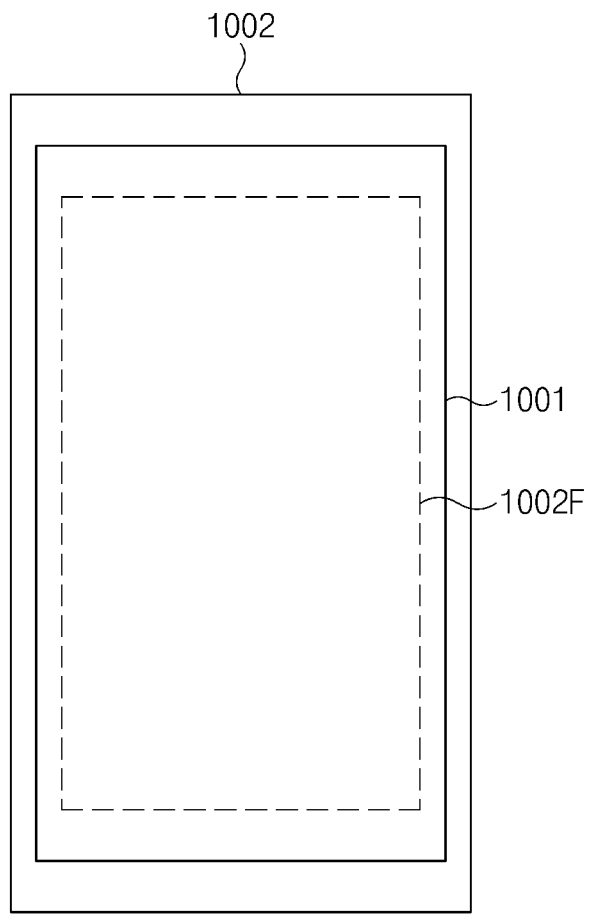
FIG. 10 is a top view schematically illustrating an electronic device according to an embodiment.

FIG. 10 is a top view schematically illustrating an electronic device according to an embodiment. FIG. 11 is a view illustrating an operation of an electronic device according to an embodiment.

Referring to FIG. 10, in the top view of the electronic device, a display 1001 may be located under a front plate 1002, and the display 1001 may be exposed through a substantial portion of the front plate 1002.

In addition, a fingerprint sensing area 1002F may be located on the front plate 1002. The fingerprint sensing area 1002F may refer to the area in which the fingerprint may be sensed on the front plate 1002. The fingerprint sensing area 1002F may be formed on the entire area of the front plate 1002.

A fingerprint sensor (not shown) may be located to coincide with the fingerprint sensing area 1002F on the front plate 1002. For example, the fingerprint sensor (not shown) may be printed on one surface of the front plate 1002 between the front plate 1002 and the display 1001 under the display 1001, or be etched on one surface of the front plate 1002.

The area and the location of the fingerprint sensor (not shown) and the fingerprint sensing area 1002F do not necessarily need to coincide completely, but according to an embodiment, the fingerprint sensor (not shown) is a large screen fingerprint sensor which corresponds to the fingerprint sensing area 1002F formed on the entire area of the front plate 1002. That is, the area of the fingerprint sensor (not shown) may be similar to the area of the display 1001 or the front plate 1002.

Figure 11:
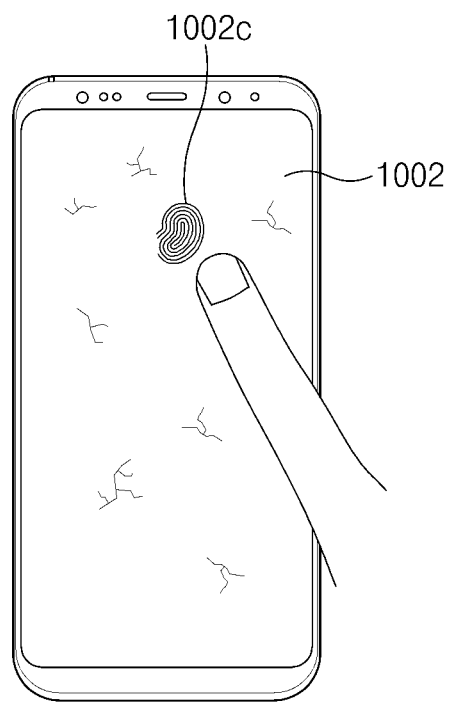
FIG. 11 is a view illustrating an operation of an electronic device according to an embodiment.

Referring to FIG. 11, in the case of an electronic device equipped with a large-screen fingerprint sensor, when it is determined that there is a contamination in the fingerprint sensing area during fingerprint authentication or fingerprint registration, a fingerprint recognition area 1002C may be guided away from the area where the contamination is identified. The guidance of the fingerprint recognition area 1002C may be provided through a fingerprint shape for guiding a location on which finger is placed.

One of the methods described in the above-described embodiments may be used for the contamination determination and the identification of the contamination location in the fingerprint sensing area. Alternatively, according to an embodiment, the electronic device may perform a contamination detection operation at all times or in a specific situation (impact detection), store the location of the area where the contamination is detected in a memory, and display a guide for fingerprint authentication or registration on an area except for the stored location when fingerprint authentication or registration is requested. According to an embodiment, when motion or audio corresponding to a fall or an impact is detected, the electronic device may perform a contamination detection. One of the methods described in the above embodiments may be used for the contamination detection. The motion may be detected through an acceleration sensor and/or a gyro sensor, and the fall direction and the impact amount may be determined. Audio may be monitored through a microphone working at all times.

Hereinafter, a configuration included in an electronic device according to an embodiment will be described with reference to FIGS. 5 and 12.

Figure 12:
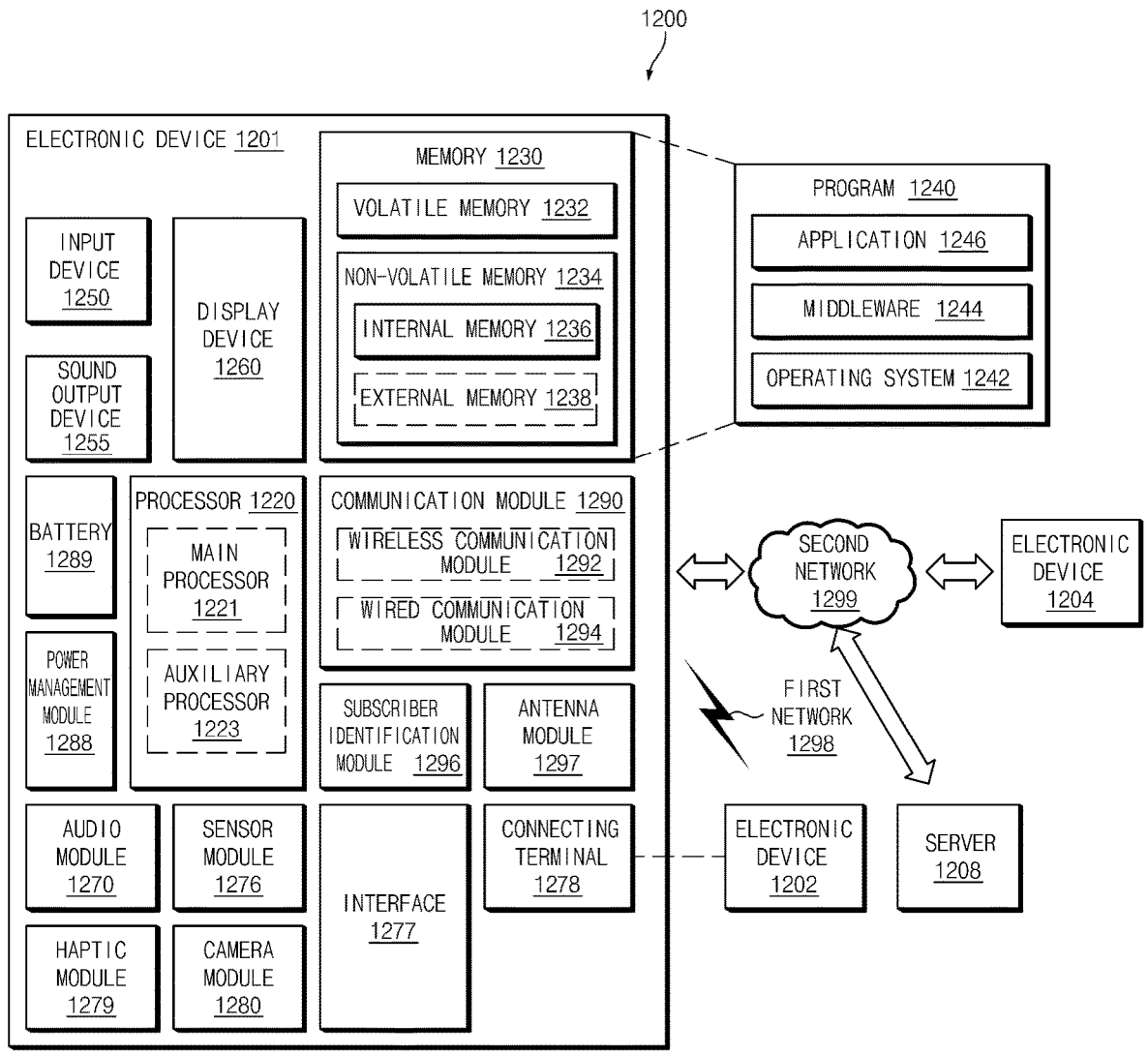
FIG. 12 is a block diagram of an electronic device in a network environment according to an embodiment.

FIG. 12 is a block diagram of an electronic device in a network environment according to an embodiment.

Referring to FIG. 5 and FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display). The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. The processor 1220 may include the image analysis unit 503, the contamination determination unit 504, the contamination processing unit 505, the fingerprint registration management unit 506, and the fingerprint authentication unit 507 described with reference to FIG. 5. The functions of the image analysis unit 503, the contamination determination unit 504, the contamination processing unit 505, the fingerprint registration management unit 506, and the fingerprint authentication unit 507 described with reference to FIG. 5 may be performed by the processor 1220.

According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221. The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234. The memory 1230 may include the image storage unit 502 described with reference to FIG. 5.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The sensor module 1276 may include the fingerprint sensor 501 described with reference to FIG. 5.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297. At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)). According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an electronic device according to an embodiment will be described. For brevity, descriptions of features and configurations previously explained above are omitted below.

According to an embodiment, when motion or audio corresponding to a fall or an impact is detected, the electronic device may perform the contamination detection. Thereafter, when there is a fingerprint sensor registration or authentication request within a specified period of time, the electronic device may reject the fingerprint registration or not perform fingerprint authentication based on whether contamination is detected.

The electronic device according to an embodiment may determine whether recognition is possible based on to the detection position, the area of the contamination, and the like. When the contamination detection area is large, the user may be informed that fingerprint authentication and fingerprint registration are impossible. In this case, it may be determined that the contamination has a significant (or more than a specified reference) effect on the fingerprint recognition rate.

In addition, the electronic device according to an embodiment may display a guide for authenticating the user by another authentication scheme when contamination is detected in the fingerprint sensing area. For example, when it is determined that the contamination detection area of the fingerprint sensing area has a significant (or more than a specified reference) effect on the fingerprint recognition rate, the electronic device according to an embodiment may display a guide for authenticating the user through another authentication scheme.

In addition, the electronic device according to an embodiment may display a message to replace the display or the protective film when contamination is detected in the fingerprint sensing area. For example, when it is determined that the contamination detection area of the fingerprint sensing area has a significant (or more than a specified reference) effect on the fingerprint recognition rate, the electronic device may display a message for replacing the display or the protective film.

In addition, in the embodiment of FIG. 6, the contamination is determined based on the background image and the fingerprint is registered or rejected. According to an embodiment, when the contamination is detected, an operation of removing the background image from the fingerprint and registering the fingerprint image may be further included.

According to the embodiments of the disclosure, when a fingerprint is registered in an electronic device in which a fingerprint sensing area is located on a front plate or a display, the fingerprint may be registered in consideration of contamination of the fingerprint sensing area.

According to the embodiments of the disclosure, even when there is contamination in the fingerprint sensing area, it is possible to provide a method of registering a fingerprint image from which such contamination is removed.

According to the embodiments of the disclosure, during fingerprint registration or authentication, it is possible to detect various contaminations, such as scratches, dirt, cracks, and air bubbles between the glass and the film, on the surface of the display itself of the electronic device, the front plate that protects the display, the protective film attached to protect the front plate, or the like which is exposed to an outside.

According to the embodiments of the disclosure, the contamination generated in the fingerprint sensing area may be sensed together with a user fingerprint to create an incorrect information area in the fingerprint image, and may prevent the fingerprint image from being registered, so that it is possible to provide an electronic device having an improved fingerprint reliability and a reduced authentication failure rate.

According to the embodiments of the disclosure, because the fingerprint image including contamination is prevented from being updated as the fingerprint template during the fingerprint registration process or fingerprint authentication, it is possible to provide an electronic device having a reduced false recognition rate at which the fingerprint of another person is recognized as a normal fingerprint.

According to the embodiments of the disclosure, it is possible to provide an electronic device having improved reliability and reduced authentication failure rate by identifying contamination of a fingerprint recognition area of the electronic device.

In addition, various effects that are directly or indirectly understood through the present disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
a housing including a first plate facing a first direction, the first plate including a fingerprint sensing area, a second plate facing a second direction opposite to the first direction, and a side member interposed between the first plate and the second plate and arranged in at least a portion of a side surface of the electronic device;
a touch screen display interposed between the first plate and the second plate and having at least a portion exposed through the first plate of the housing;
a fingerprint sensor interposed between the touch screen display and the second plate; and
a processor connected to the fingerprint sensor,
wherein the processor is configured to:
capture a fingerprint image of a user using the fingerprint sensor;
perform determining of whether the fingerprint sensing area is contaminated when an impact is sensed in the electronic device;
capture a background image using the fingerprint sensor when the processor determines that the fingerprint sensing area is contaminated and a fingerprint of the user is absent in the fingerprint sensing area;
remove the background image from the fingerprint image;
determine whether to proceed with fingerprint registration based on whether a shape which at least partially matches with a shape in the fingerprint image is identified in an image obtained by removing the background image from the fingerprint image; and
prevent registration of the fingerprint image when the processor determines that the fingerprint image was captured by the fingerprint sensor within a specified period of time from a time of the impact.

2. The electronic device of claim 1, wherein the processor is further configured to:
display a screen for guiding a fingerprint recognition location and a fingerprint recognition time.

3. The electronic device of claim 1, wherein the processor is further configured to:
determine whether the fingerprint sensing area is contaminated based on whether at least a partially matched shape is identified by comparing a plurality of fingerprint images captured by the fingerprint sensor.

4. The electronic device of claim 1, wherein the processor is further configured to:
register the image if the shape in the image matches with the shape in the fingerprint image by less than a specified reference.

5. The electronic device of claim 1, wherein the processor is further configured to:
guide an area to recognize a fingerprint away from a contaminated area when the processor determines that the fingerprint sensing area is contaminated.

6. The electronic device of claim 1, wherein the processor is further configured to:
determine whether the fingerprint sensing area is contaminated periodically or when the impact occurs in the electronic device, and store information about a contaminated area.

7. The electronic device of claim 1, wherein the processor is further configured to:
display a guide to perform user authentication in another authentication scheme when the processor determines that the fingerprint sensing area is contaminated.

8. The electronic device of claim 1, wherein the processor is further configured to:
capture the background image periodically or when an environment of the electronic device is changed.

9. The electronic device of claim 1, wherein the processor is further configured to:

when the processor determines that the fingerprint sensing area is not contaminated, store the fingerprint image as a fingerprint template to be used for fingerprint authentication.

10. The electronic device of claim 1, wherein the processor is further configured to:
display a guide to replace the first plate or a protective film of the first plate when the processor determines that the fingerprint sensing area is contaminated.

* * * * *